United States Patent
Yoon et al.

(10) Patent No.: US 12,489,176 B2
(45) Date of Patent: Dec. 2, 2025

(54) SEPARATOR FOR ELECTROCHEMICAL DEVICE HAVING IMPROVED COMPRESSION RESISTANCE, ELECTROCHEMICAL DEVICE COMPRISING SAME, AND METHOD FOR PRODUCING SAME

(71) Applicant: LG ENERGY SOLUTION, LTD., Seoul (KR)

(72) Inventors: Yeo-Ju Yoon, Daejeon (KR); Seong-Jun Kim, Daejeon (KR); Jin-Young Shin, Daejeon (KR); Ji-Eun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/834,187

(22) PCT Filed: Jul. 5, 2023

(86) PCT No.: PCT/KR2023/009457
§ 371 (c)(1),
(2) Date: Jul. 29, 2024

(87) PCT Pub. No.: WO2024/010349
PCT Pub. Date: Jan. 11, 2024

(65) Prior Publication Data
US 2025/0149739 A1    May 8, 2025

(30) Foreign Application Priority Data

Jul. 5, 2022   (KR) .................... 10-2022-0082782
Jul. 4, 2023   (KR) .................... 10-2023-0086258

(51) Int. Cl.
| | |
|---|---|
| *H01M 50/451* | (2021.01) |
| *H01M 50/403* | (2021.01) |
| *H01M 50/426* | (2021.01) |
| *H01M 50/431* | (2021.01) |
| *H01M 50/443* | (2021.01) |
| *H01M 50/491* | (2021.01) |

(52) U.S. Cl.
CPC ....... *H01M 50/451* (2021.01); *H01M 50/403* (2021.01); *H01M 50/426* (2021.01); *H01M 50/431* (2021.01); *H01M 50/443* (2021.01); *H01M 50/491* (2021.01)

(58) Field of Classification Search
None
See application file for complete search history.

(56) References Cited

U.S. PATENT DOCUMENTS

| | | |
|---|---|---|
| 2018/0166672 A1 | 6/2018 | Honda et al. |
| 2020/0047473 A1 | 2/2020 | Miura et al. |
| 2021/0057703 A1 | 2/2021 | Hamada et al. |

FOREIGN PATENT DOCUMENTS

| | | |
|---|---|---|
| CN | 113178663 A | 7/2021 |
| JP | 2015-120786 A | 7/2015 |
| JP | 2021-123614 A | 8/2021 |
| KR | 10-2006-0021221 A | 3/2006 |
| KR | 10-1341196 B1 | 12/2013 |
| KR | 10-2017-0020764 A | 2/2017 |
| KR | 10-2017-0024574 A | 3/2017 |
| KR | 10-2019-0042842 A | 4/2019 |
| KR | 10-1996642 B1 | 7/2019 |
| KR | 10-1998832 B1 | 9/2019 |
| KR | 10-2020-0007745 A | 1/2020 |
| KR | 10-2020-0051370 A | 5/2020 |
| KR | 10-2020-0078416 A | 7/2020 |
| KR | 10-2020-0088657 A | 7/2020 |
| KR | 10-2021-0014430 A | 2/2021 |
| KR | 10-2021-0106274 A | 8/2021 |
| KR | 10-2021-0137000 A | 11/2021 |
| KR | 10-2021-0148257 A | 12/2021 |
| KR | 10-2022-0005982 A | 1/2022 |
| WO | WO2009/044741 A1 | 4/2009 |
| WO | WO2014/083988 A1 | 6/2014 |
| WO | WO2014/147888 A1 | 9/2014 |
| WO | WO2015/056385 A1 | 4/2015 |
| WO | WO2019/130994 A1 | 7/2019 |

OTHER PUBLICATIONS

Particulate, available online at https://www.thefreedictionary.com/particulate, date unknown.*
International Search Report for PCT/KR2023/009457 (PCT/ISA/210) mailed on Oct. 24, 2023.
Extended European Search Report for European Application No. 23835815.4, dated Sep. 22, 2025.

* cited by examiner

*Primary Examiner* — Anca Eoff
(74) *Attorney, Agent, or Firm* — Birch, Stewart, Kolasch & Birch, LLP

(57) ABSTRACT

Disclosed is a separator for an electrochemical device that includes a polymer substrate with small and uniform pores and an aqueous organic/inorganic composite porous coating layer and an adhesive coating layer and which is improved in compression resistance, and a method of making the separator and the electrochemical device including the separator. The separator with improved compression resistance is not easily deformed by well resisting pressure applied thereto during a lamination process in which an electrode and the separator are applied with heat and pressure so as to be bonded to each other. In addition, when pressure is applied, the coating layer serves as a buffer, thereby reducing the pressing force exerted on the porous substrate. Thus, deformation of the separator is inhibited.

19 Claims, 5 Drawing Sheets

[FIG. 1A]
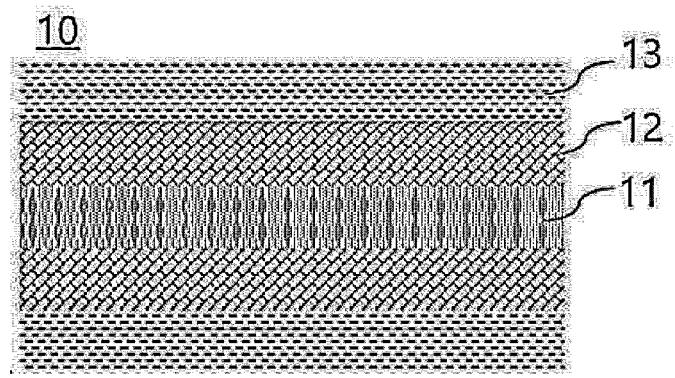
[FIG. 1B]
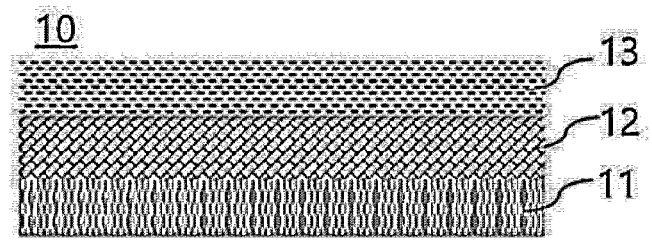
[FIG. 2]
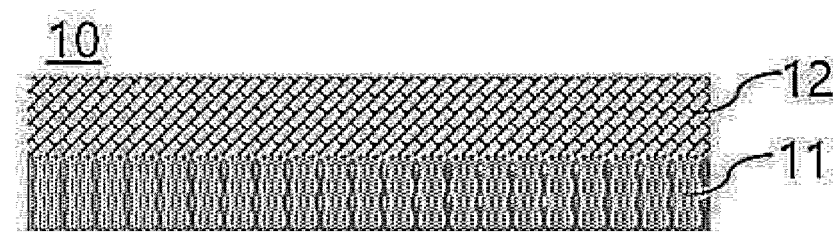

[FIG. 3]
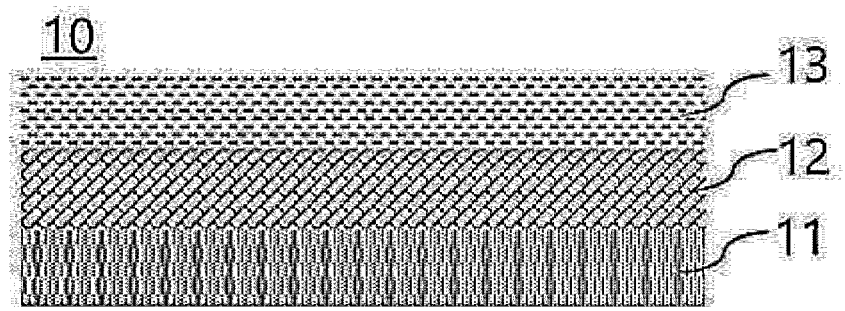

[FIG. 4]
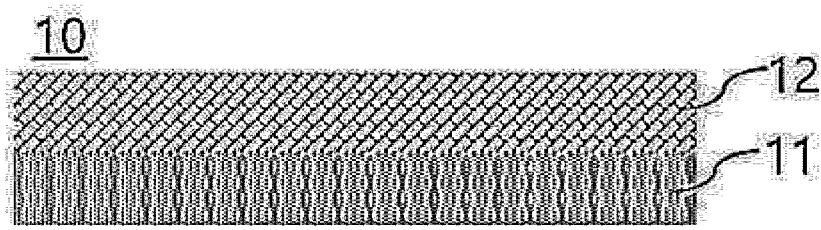
[FIG. 5]
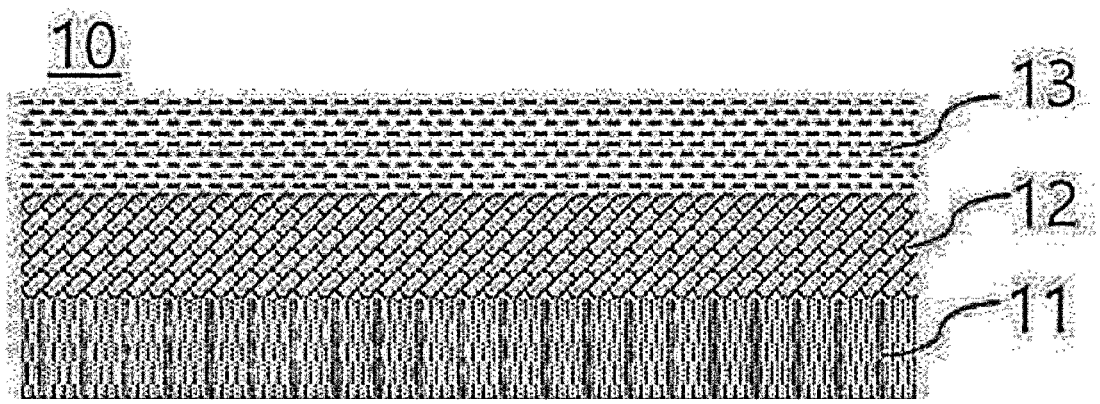

[FIG. 6]
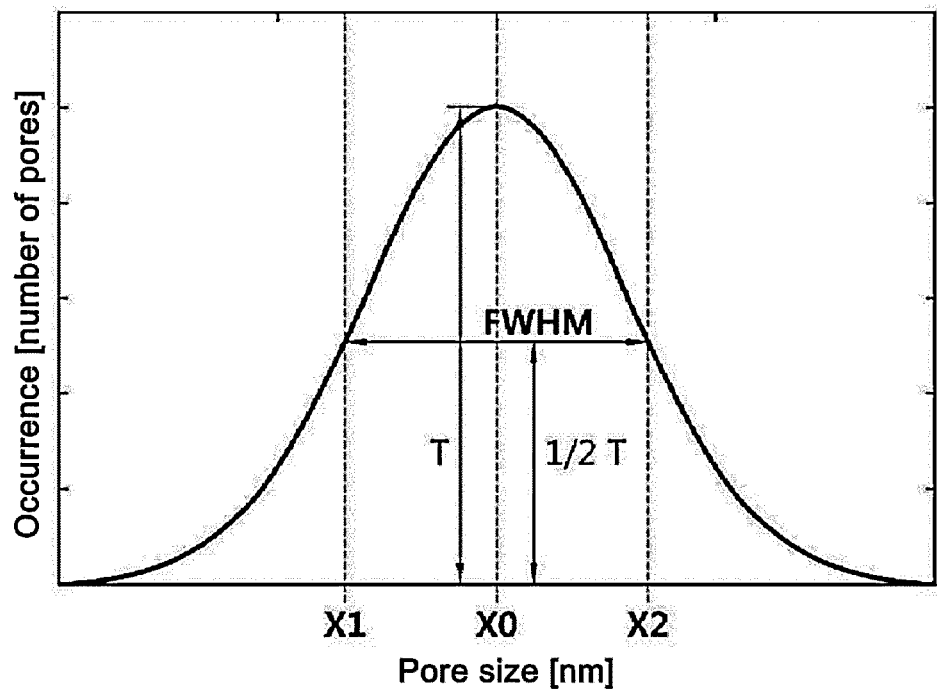

[FIG. 7]
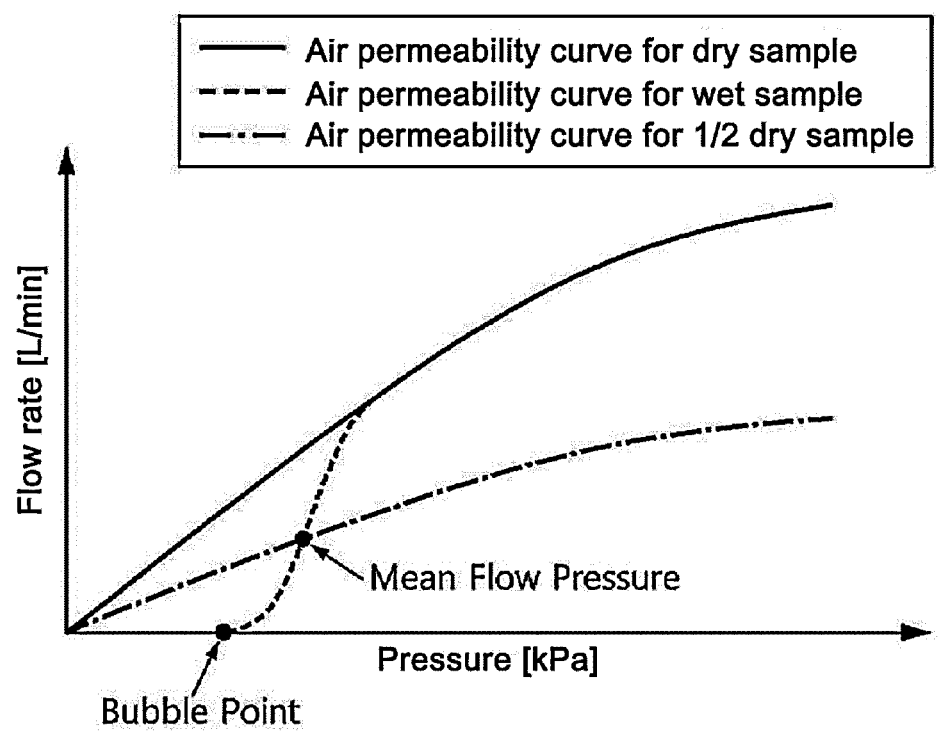

SEPARATOR FOR ELECTROCHEMICAL DEVICE HAVING IMPROVED COMPRESSION RESISTANCE, ELECTROCHEMICAL DEVICE COMPRISING SAME, AND METHOD FOR PRODUCING SAME

CROSS REFERENCE TO RELATED APPLICATION

The present application claims priority to Korean Patent Application No. 10-2022-0082782, filed Jul. 5, 2022 and Korean Patent Application No. 10-2023-0086258, filed Jul. 4, 2023, respectively, the entire contents of which is incorporated herein for all purposes by this reference.

BACKGROUND OF THE INVENTION

1. Field of the Invention

The present disclosure relates to a separator for an electrochemical device such as a secondary battery, an electrochemical device including the separator and a method for manufacturing the separator. In particular, the separator, according to the present disclosure, includes a porous sheet including a polymer material.

2. Description of the Related Art

A secondary battery is generally primarily comprised of a cathode, an anode, a separator, and an electrolyte solution and can be charged and discharged while chemical energy and electrical energy are reversibly converted, and a lithium ion secondary battery is representative. Lithium-ion secondary batteries are energy storage materials with high energy density and are widely used in small electronic devices such as mobile phones and notebook computers. Recently, applications to hybrid electric vehicles (HEVs), plug-in EVs, electric bicycles (e-bike), and energy storage systems (ESS) have been rapidly expanding in response to environmental problems, high oil prices, energy efficiency, and storage.

In the manufacture and use of such a lithium secondary battery, securing the safety of the lithium secondary battery important. In particular, a separator commonly used in a lithium secondary battery may have safety problems, such as an internal short circuit due to its material characteristics and manufacturing process characteristics, exhibiting extreme thermal shrinkage behavior in situations such as high temperature. Recently, in order to secure the safety of lithium secondary batteries, an organic/inorganic composite porous separator in which a porous coating layer is formed by coating a mixture of inorganic particles and a binder on a porous polymer substrate has been proposed. However, when an electrode assembly is formed by laminating an electrode and a separator, the electrode and the separator may be separated from each other due to insufficient adhesive force, and in this case, the inorganic particles deintercalated from the porous coating layer may act as a local defect in the lithium secondary battery device.

In order to solve this problem, it is considered to further arrange an adhesive layer including an adhesive binder resin in order to impart adhesion force to the porous coating layer, but when both the organic/inorganic composite porous coating layer and the adhesive layer are disposed on the surface of the porous polymer substrate, the binder resin may flow into the pores of the porous polymer substrate, and thus resistance is degraded. In addition, in the process of laminating the electrode when manufacturing the electrode assembly, the organic/inorganic porous coating layer caused damage such as excessive pressing of the polymer substrate or tearing of the polymer substrate. Accordingly, there is an urgent need for the development of a new separator having excellent adhesion force to the electrode and durability.

SUMMARY OF THE INVENTION

An objective of the present disclosure is to provide a separator for an electrochemical device having improved compression resistance. In addition, another objective of the present disclosure is to provide an electrochemical device including the separator. Furthermore, another objective of the present disclosure is to provide a method for manufacturing the separator. It will be readily apparent that other objectives and advantages of the present disclosure can be realized by means or methods and combinations thereof described in the claims.

One aspect of the present disclosure relates to a separator for an electrochemical device, the separator comprising: a porous polymer substrate; an organic/inorganic composite porous coating layer on at least one surface of the porous polymer substrate; and an adhesive coating layer on a surface of the porous organic/inorganic composite porous coating layer opposite the porous polymer substrate, in which the porous polymer substrate has pores with an average pore size of 40 nm or less and is a polymer membrane in which the dispersion of the pores having a value of a full width at half maximum (FWHM) of a Gaussian pore distribution measured through the distribution of the pore size distribution of 8.0 nm or less, in which the organic/inorganic composite porous coating layer comprises a particulate binder resin and inorganic particles, the particulate binder resin comprises an acrylic binder resin and a PVdF-containing binder resin, and the adhesive coating layer comprises a polyvinylidene fluoride-containing (PVdF-containing) binder resin.

In another aspect of the present disclosure, the porous polymer substrate has an air permeability of 100 sec/100 cc or less and a resistance of 0.6 ohms or less.

In another aspect of the present disclosure, the separator has a permeability of 100 sec/100 cc or less and a resistance of 0.6 ohms or less.

In another aspect of the present disclosure, the porous polymer substrate has a porosity of 20 vol. % to 50 vol. %.

In another aspect of the present disclosure, the organic/inorganic composite porous coating layer may comprise the inorganic particles and the binder resin in a weight ratio of about 75:25 to about 90:10.

In another aspect of the present disclosure, an amount of a mixture of the inorganic particles and the binder resin in the organic/inorganic composite porous coating layer is 99% by weight or more based on 100% by weight of the total organic/inorganic composite porous coating layer.

In another aspect of the present disclosure, the PVdF-containing binder resin and the acrylic binder resin in the organic/inorganic composite porous coating layer are comprised in a weight ratio of 30:70 to 5:95.

In another aspect of the present disclosure, the adhesive coating layer comprises 90% by weight or more of the PVdF-containing binder resin based on 100% by weight of the total adhesive coating layer.

In another aspect of the present disclosure, the PVdF-containing binder resin of the adhesive coating layer has a weight-average molecular weight of 600,000 Da or less.

In another aspect of the present disclosure, the PVdF-containing binder resin of the organic/inorganic composite porous coating layer and the PVdF-containing binder resin of the adhesive coating layer each comprise a copolymer of vinylidene fluoride and a monomer copolymerizable with vinylidene fluoride as a in polymerization unit, and the copolymer comprises 70% by weight or more of vinylidene fluoride.

In another aspect of the present disclosure, the PVdF-containing binder resins have a degree of substitution by the monomer of 1% to 40% by weight.

In another aspect of the present disclosure, the particulate binder is maintained in a particulate form in the separator.

In another aspect of the present disclosure, the thickness of the adhesive coating layer is 8% to 30% based on 100% of the thickness of the organic/inorganic composite coating layer.

Another aspect of the present disclosure relates to an electrochemical device, including an anode, a cathode, the separator disclosed herein between the anode and the cathode.

Another aspect of the present disclosure relates to a method for manufacturing the separator, wherein the method comprises: preparing a porous polymer substrate; forming the organic/inorganic composite porous coating layer on the at least one surface of the polymer substrate; and forming an adhesive coating layer on the surface of the organic/inorganic composite porous coating layer opposite the porous polymer substrate, wherein the forming of the organic/inorganic composite porous coating layer is performed by dispersing the inorganic particles and the particulate binder resin in an aqueous solvent as a dispersion medium to prepare a slurry for forming an organic/inorganic composite porous coating layer, coating the slurry on the surface of the porous polymer substrate, and drying the slurry, and the forming of the adhesive coating layer is performed by dispersing a particulate binder resin as an aqueous solvent as a dispersion medium to prepare a composition for forming an adhesive coating layer, coating the composition on the surface of the organic/inorganic composite porous coating layer, and drying the composition.

In another aspect of the present disclosure, the organic/inorganic composite porous coating layer has a porosity of 50 vol % to 85 vol %.

In another aspect of the present disclosure, the organic/inorganic composite porous coating layer has a thickness of 0.1 μm to 10 μm.

In another aspect of the present disclosure, the particulate binder resin has a glass transition temperature of −100° C. to 50° C. and a melting temperature of 50° C. to 150° C.

In another aspect of the present disclosure, the average pore size of the porous polymer substrate is 27 nm or less.

The separator for an electrochemical device, according to the present disclosure, includes a porous polymer substrate having a small and uniform pore size and is provided with an organic/inorganic composite porous coating layer and an adhesive coating layer of a water-based method, thereby improving compression resistance.

In the lamination process of bonding the electrode and the separator by applying heat and pressure, when pressure is applied according to charging/discharging inside the battery, damage to the separator may occur. In particular, in a part where the thickness of the fabric is greatly reduced locally, the insulation is broken, resulting in a short circuit. As a result, when the pore characteristics formed in the separator are deformed, the movement path and the speed of lithium ions are changed, and thus the life performance and the rate speed characteristics of the battery are also affected. In addition, if the separator is deformed to cause overvoltage, the possibility of Li-plating in which the potential of the anode rapidly drops to 0 V increases. Therefore, by applying a separator having improved compressive resistance, the separator may endure an applied pressure and may have the effect of suppressing the deformation of the separator. In particular, in the separator of the present disclosure, when pressure is applied, the coating layer structure serves as a buffer, thereby reducing the pressure on the porous substrate and suppressing the deformation of the separator.

BRIEF DESCRIPTION OF THE DRAWINGS

The drawings attached to the present specification illustrate a preferred embodiment of the present disclosure and serve to better understand the technical idea of the present disclosure together with the contents of the present disclosure, and thus the present disclosure is not limited thereto. The shape, size, scale, or ratio of elements in the drawings included in this specification may be exaggerated to emphasize a clearer description.

FIG. 1A is a schematic diagram showing a cross-sectional structure (Example 1 and Example 2) of a separator according to an embodiment of the present disclosure;

FIG. 1B is a schematic diagram showing Example 1;

FIGS. 2, 3, 4, and 5 are schematic diagrams showing the cross-sectional structure of the separators of Comparative Examples 1, 2, 3, and 4, respectively;

FIG. 6 is a graph of the full width at half maximum (FWHM) according to the PDS distribution, in which the full width at half maximum (FWHM) may be expressed as a difference between two points X2 and X1 on the x-axis, which are two points on the x-axis corresponding to ½(½T) of the y-axis maximum value (T); and FIG. 7 shows a dry sample air permeability curve and a wet sample air permeability curve.

DESCRIPTION OF SYMBOLS

10: Separator
11: Polymer substrate
12: Organic/inorganic composite porous coating layer
13: Adhesive coating layer

DESCRIPTION OF THE PREFERRED EMBODIMENTS

Hereinafter, the present disclosure will be described in detail. Prior to this, terms or words used in the specification and claims should not be construed as conventional or dictionary meanings, but should be construed as meanings and concepts conforming to the technical idea of this invention based on the principle that the inventor can appropriately define the concept of terms to describe his invention in the best way. Therefore, since the configurations described in the embodiments described herein are only the most preferred embodiments of the present disclosure and do not represent all the technical ideas of the present disclosure, it should be understood that there may be various equivalents and modifications that may replace them at the time of the present application.

Throughout this specification, when a part "includes" a certain component, it means that other components may be further included, rather than excluding other components, unless otherwise stated.

In addition, the terms "about", "substantially", etc. used throughout this specification are used as meanings at or close to the numerical values when manufacturing and material tolerances inherent in the stated meanings are presented to aid the understanding of the present application. It is used to prevent an unconscionable infringer from using the mentioned disclosure in an unreasonable way.

Throughout this specification, the description of "A and/or B" means "A or B or both".

The specific terminology used in the detailed description that follows is for the sake of convenience and not limitation. The words "right", "left", "top" and "bottom" indicate directions in the drawings to which reference is made. The words "inwardly" and "outwardly" refer respectively to directions towards or away from the geometric center of the designated device, system, and members thereof. "Front", "rear", "above", "below" and related words and phrases thereof represent positions and orientations in the drawing where the reference is made and should not be limited. These terms include the words listed above, derivatives thereof, and words of similar meaning.

The present disclosure relates to a separator for an electrochemical device. In the present disclosure, the electrochemical device is a device that converts chemical energy into electrical energy by an electrochemical reaction and is a concept including a primary battery and a secondary battery, and the secondary battery is capable of charging and discharging and is a concept including a lithium ion battery, a nickel-cadmium battery, a nickel-hydrogen battery, and the like.

1. Separator

In the present disclosure, the separator may provide a movement path of metal ions, such as lithium ions between, the cathode and the anode while preventing a short circuit between the cathode and the anode by electrically insulating the anode and the cathode. FIG. 1A is a schematic diagram showing a cross-section of a separator 10 according to an embodiment of the present disclosure. The separator 10, according to the present disclosure, includes a porous polymer substrate 11 including a plurality of pores and an organic/inorganic composite porous coating layer 12 on at least one surface of the polymer substrate. In addition, an adhesive coating layer 13 is on the outermost surface of the separator. In a preferred embodiment, the separator includes a porous polymer substrate 11, an organic/inorganic composite porous coating layer 12 on one surface of the polymer substrate, and an adhesive coating layer 13 on the surface of the organic/inorganic composite porous coating layer opposite the porous coating layer. The organic/inorganic composite porous coating layer and the adhesive coating layer may be on one or both surfaces of the polymer substrate. Hereinafter, the separation membrane of the present disclosure will be described in detail for each component.

1) Porous Polymer Substrate

The porous polymer substrate functions as a porous ion-conducting barrier that passes ions while blocking electrical contact between an anode and a cathode, and is a polymer membrane having a porous characteristic in which a plurality of pores is formed therein. Since the pores include open pores having a structure connected to each other, gas or liquid can pass from one side of the substrate to the other side.

In one embodiment of the present disclosure, the porous polymer substrate includes a polymer material, and the polymer material may include a thermoplastic resin in view of imparting a shutdown function to the separator. The shutdown function refers to a function of preventing thermal runaway of the battery by blocking the movement of ions by dissolving the polymer material contained in the substrate and closing the pores of the polymer substrate when the battery temperature is increased. In one embodiment of the present disclosure, the thermoplastic resin may include a polyolefin-containing resin having a melting temperature (melting point) of less than 200° C. Examples of the polyolefin-containing resin may include polyethylene, polypropylene, polybutene, polypentene, and the like and may include one or more of these resins. As a specific example, the polyolefin-containing resin may include two or more selected from polyethylene, polypropylene, and polypentene. In another example, the polyolefin-containing resin may be polyethylene and/or polypropylene.

In one embodiment of the present disclosure, the weight-average molecular weight (Mw) of the polyolefin-containing resin may be in a range of 300,000 Da to 1.5 million Da. When the weight-average molecular weight (Mw) satisfies the above range of 300,000 Da to 1.5 million D, the polymer substrate has excellent mechanical properties and good film formability. When the weight-average molecular weight (Mw) is excessively high, there may be a problem in that film molding is difficult.

In the present disclosure, the weight-average molecular weight (Mw) may be measured by gel permeation chromatography (GPC, PL GPC220, Agilent Technologies), and the measurement conditions may be set as follows.

Column: PL Olexis (Polymer Laboratories Co.)
Solvent: TCB (Trichlorobenzene)
Flow rate: 1.0 ml/min
Sample concentration: 1.0 mg/ml
Injection amount: 200 µl
Column temperature: 160° C.
Detector: Agilent high-temperature RI detector
Standard: Polystyrene (corrected by cubic function)

The weight-average molecular weight measurement method may be applied to the polymer material mentioned in the present specification in addition to the weight-average molecular weight measurement of the polyolefin-containing resin.

In addition to the above polyolefin-containing resins, the polymer material may include at least one selected from among polyethylene terephthalate, polybutylene terephthalate, polyacetal, polyamide, polycarbonate, polyimide, polyether ether ketone, polyether sulfone, polyphenylene oxide, polyphenylene sulfide, and polyethylene naphthalate.

In one embodiment of the present disclosure, the porous polymer substrate may include one or more nonwoven sheets or one or more polymer films. Otherwise, the porous polymer substrate may include one or more nonwoven fabrics and one or more polymer films. In one embodiment of the present disclosure, the porous polymer substrate may be a single layer. Alternatively, the porous polymer substrate may have a laminate structure in which two or more layers of a nonwoven fabric and/or a film are laminated. The polymer film may mean a film formed in a sheet shape by melting/extruding a polymer resin.

In the present disclosure, the porous polymer substrate preferably has a thickness of 7 µm to 15 µm. If the thickness is excessively thick beyond the above range of 7 µm to 15 µm, the conduction path of the Li-ion may be lengthened to cause an increase in resistance, which may degrade battery performance later. If the thickness is too thin, the function of the conductive barrier may be deteriorated, and the short circuit occurrence rate may increase.

In one embodiment of the present disclosure, the thickness of the porous polymer substrate may be measured by applying a contact thickness measuring device. The contact-type thickness gauge may use, for example, Mitutoyo's VL-50S-B.

Meanwhile, in one embodiment of the present disclosure, the average diameter of the pores of the porous polymer substrate may be 40 nm or less, preferably, for example, 30 nm or less. In the case where the pore size is excessively large beyond the above range of 40 nm or less, when pressure is applied during battery manufacturing, such as a lamination process, the deformation of the shape before and after compression may be large, which is not preferable.

The average diameter of the pores may be calculated through image processing software (SigmaScan Pro 5.0, etc.) using a scanning electron microscopy (SEM) image. Alternatively, an air permeability curve of a half dry sample and an air permeability curve of a wet sample are obtained using a capillary flow porometer method, and the size corresponding to the intersection of the two curves may be used as the average diameter of the pores.

In one embodiment of the present disclosure, the air permeability of the porous polymer substrate may be 100 sec/100 cc or less, for example, it may be 60 to 85 sec/100 cc. The mechanical properties of the porous polymer substrate are low when the air permeability does not reach the above range and is excessively low. If the air permeability is too high, the path of Li-ion becomes longer, which may lead to a degradation in the life of the battery.

In the present disclosure, the permeability time refers to the time being taken for 100 ml of air to pass through a sample such as a porous polymer substrate or a separator having a size Qof 1 square inch under predetermined air pressure, and a second/100 cc may be used as a unit. In addition, it can be used interchangeably with the transmission time and is usually expressed as a Gurley value or the like. In one embodiment of the present disclosure, the air permeability may be measured according to standard regulations in the art. For example, the air permeability may be measured using a known Gurley Densometer according to ASTM D 726-58 or ASTM D726-94. For example, air permeability may be the time in seconds for 100 ml of air passing through a sample of 1 square inch (or 6.54 cm$^2$) under an air pressure of 0.304 (kPa) or water pressure of 1.215 kN/m$^2$. According to another embodiment, the air permeability may be expressed in seconds by measuring 100 ml of air to pass through a sample of 1 square inch under constant pressure of 4.8 inch H$_2$O at room temperature according to the Gurley measurement method of the Japanese Industrial Standard (JIS-P8117). In one embodiment of the present disclosure, the air permeability may be measurable using, Asahi Seiko EG01-55-1MR equipment according to the above standard regulations.

In the present disclosure, the polymer substrate has a full width at half maximum peak height (FWHM) of 8.0 nm or less in a pore diameter distribution according to a normal distribution (Gaussian distribution) measured through the pore size distribution. The full width at half maximum is defined as the difference in size between two points on the x-axis, which is half the maximum value (mode among pore sizes) on the y-axis in the normal distribution for the pore size distribution shown by classifying pores formed inside the polymer substrate according to their sizes. In the distribution, the x-axis represents the size (diameter) of the pores, and the y-axis represents the frequency of the number of pores corresponding to the size of the pores on the x-axis (the number of pores or the percentage of the number of pores, etc.). In the present disclosure, the unit of the x-axis may be expressed in nm or μm. Referring to FIG. 6, the full width at half maximum (FWHM) may be expressed as a difference between two points X2 and X1 on the x-axis, which are two points on the x-axis corresponding to ½(½T) of the y-axis maximum value (T). The difference may be expressed as an absolute value. Meanwhile, the normal distribution may represent symmetric and asymmetric, and arbitrary distributions other than normal with respect to a maximum value.

In one embodiment of the present disclosure, the full width at half maximum may be determined from the distribution of pores other than the pores having the largest diameter. In the present disclosure, the shape of the pores may be circular, oval, or amorphous, and the cross-section may be a closed curve. The diameter of the pores means the longest length among the distances between any two points in the closed curve. When the above range of 8.0 nm or less is satisfied, the polymer substrate has a small pore size and a high pore size uniformity. A polymer substrate having these characteristics has high shape stability and may exhibit a high dielectric breakdown voltage.

In one embodiment aspect of the present disclosure, the polymer substrate may have a resistance of 0.6 ohms or less. If the resistance is excessively high, it may be undesirable because lifespan characteristics may be deteriorated during repeated battery charging and discharging processes. The porous polymer substrate of the present disclosure has a small pore size and not high porosity as described herein, but as described above, the full width at half maximum is uniformly distributed to 8.0 nm or less so that the resistance can be maintained at a low level.

In one embodiment of the present disclosure, the porosity of the polymer substrate may be 20 vol % to 50 vol %. When the porosity is too low, by-products may be generated due to the degradation of Li-ions during charging/discharging and may be deposited in the pores to deteriorate the lifespan of the battery. When the porosity is too high, the mechanical properties of the separator may be deteriorated, and it is difficult to secure uniform mechanical properties over the entire surface of the separator.

The porosity refers to the ratio of the volume occupied by the pores to the total volume, vol % is used as its unit and can be used interchangeably with terms such as space porosity and multi-porosity. In the present disclosure, the measurement of the porosity is not particularly limited, and a method known in the art may be applied. For example, the measurement of the porosity can be measured by Brunauer-Emmett-Teller (BET) measurement method using nitrogen gas, water intrusion porosimeter method, capillary flow porometer, or mercury infiltration method (Hg porosimeter). Alternatively, in one embodiment of the present disclosure, the porosity of the porous polymer substrate may be calculated from the difference between the apparent density and the net density, in which apparent density is obtained from the measurement of the porous polymer substrate, and the net density of the porous polymer substrate is calculated from the composition ratio of the materials contained in the porous polymer substrate and the density of each component. For example, the porosity can be calculated by the following [Formula 1].

$$\text{Porosity } (vol \%) = \{1 - (\text{apparent density/net density})\} \times 100 \quad \text{[Formula 1]}$$

The apparent density in the above formula can be calculated from the following [Formula 2].

$$\text{Apparent density (g/cm}^3) = \quad \text{[Formula 2]}$$
$$\{\text{weight of porous polymer substrate [g]}/$$
$$(\text{thickness of porous polymer substrate [cm]} \times$$
$$\text{area of porous polymer substrate [cm}^2])\}$$

In one embodiment of the present disclosure, the porous polymer substrate may be prepared by a method for manufacturing a polymer film, preferably a wet manufacturing method. For example, the wet manufacturing method includes preparing the mixture S1, extruding the mixture and forming an extruded sheet S2, stretching the extruded sheet S3, removing the pore forming agent S4, and heat-setting of the extruded sheet S5.

In the step S1, a type of polymer resin is appropriately selected considering the final physical properties of the separator, and the selected polymer resin is mixed with a pore forming agent. The polymer resin may be referred to the above-described content of the porous substrate polymer resin. For example, the polymer resin may be a polyolefin-containing polymer resin. Examples of the polyolefin-containing polymer resin may include one polymer selected from polyethylene, such as high-density polyethylene, linear low-density polyethylene, low-density polyethylene or ultra-high molecular weight polyethylene, polypropylene, polybutylene, polypentene, or a combination of two or more thereof.

The pore forming agent is a material that is dispersed in a polymer, exhibits heterogeneity of a substrate prepared through extrusion, stretching, and the like, and is subsequently removed from the substrate. Accordingly, the part of the substrate where the pore forming agent was located remains in the form of pores of the substrate. The pore forming agent is preferably a material that is liquid in the extrusion process, but a material that maintains a solid state may also be used. The pore forming agent may be an aliphatic hydrocarbon-containing solvent such as liquid paraffin, paraffin oil, mineral oil, or paraffin wax; vegetable oils such as soybean oil, sunflower oil, rapeseed oil, palm oil, coconut oil, corn oil, grapeseed oil, cottonseed oil, and the like; or a plasticizer such as a dialkyl phthalate. In particular, the plasticizer may be di-2-ethylhexyl phthalate (DOP), di-butyl-phthalate (DBP), di-isononyl phthalate (DINP), di-isodecyl phthalate (DIDP), butyl benzyl phthalate (BBP), and the like. Among these, liquid paraffin (LP, also referred to as "liquid paraffin") is particularly preferred.

The content of the pore forming agent during the preparation of the separator may be appropriately adjusted to achieve a desired level of porosity. Considering the aspect of improving air permeability, it is preferable that the content of the pore forming agent is high, but when the pore forming agent is contained in an excessively excessive amount, the strength of the finally produced substrate may be adversely affected. Accordingly, the content of the pore forming agent may be 1% to 80% by weight based on 100% by weight of the total amount of polymer resin and the pore forming agent and may be adjusted to 70% by weight or less, 60% by weight or less, or 50% by weight or less within the above range as necessary and may be adjusted to 1% by weight or more, 20% by weight or more, 40% by weight or more. In terms of implementing an appropriate porosity of the porous substrate, for example, in order to implement a porosity of about 45% or less, the pore forming agent may be included in the range of 1% to 60% by weight with respect to 100% by weight of the total amount of polymer resin and the pore forming agent.

Next, the mixture prepared in the above step is extruded through an extruder to obtain an extruded sheet. The extruder is not particularly limited and may be an extruder commonly used in the art, such as but not limited to, an extruder having a T-die or a tubular die attached thereto. Although the extrusion process may be performed at a conventional extrusion temperature, it is preferable that the extrusion process is performed at a temperature condition of 10° C. to 100° C. higher than the melting point of the polymer resin used. When the extrusion process excessively exceeds the above range, the polymer resin may be thermally decomposed to make it difficult to form a film, and the physical properties of the manufactured substrate may be degraded, which is not preferable. An extruded sheet may be obtained through this extrusion process.

Thereafter, the extruded sheet is put into a stretching process. This stretching process is performed through a stretching machine commonly used in the art. The stretching machine may be a sequentially biaxial stretching machine but is not particularly limited thereto. By stretching the extruded sheet in this way, the mechanical strength of the porous substrate can be increased. The stretching process is performed in the machine direction (MD, machine direction, longitudinal direction) and/or transverse direction (TD, vertical direction). The stretching process in all or one of these directions increases the tensile strength in the corresponding stretching direction. If necessary, the separator of the present disclosure may be manufactured by performing longitudinal (MD) stretching and/or transverse (TD) stretching alone in one direction (for example, uniaxial stretching), simultaneously or sequentially in two directions (for example, biaxial stretching) in the stretching process. The temperature of the stretching film may be controlled to 100° C. to 130° C., preferably 110° C. to 125° C. For example, the temperature of the film during stretching may be controlled in a range of 115° C. to 121° C. When the stretching process is performed in the above temperature range, a film having small and uniform pores may be obtained.

Next, the pore forming agent is removed from the extruded sheet obtained above. Pore forming agent is removed by extraction with a solvent and drying. In addition, through this removal process, the space occupied by the pore forming agent is formed as pores. The solvent that can be used for extraction of the pore forming agent may be any solvent capable of extracting the pore forming agent. Still, it is suitable for using methyl ethyl ketone, methylene chloride, hexane, etc., with high extraction efficiency and fast drying. Preferably, the solvent may be methylene chloride, such as methylene dichloride (MC). As the extraction method, all common solvent extraction methods, such as an immersion method, a solvent spray method, and an ultrasonic method, may be used individually or in a combination thereof.

After the extraction of the pore forming agent, heat setting of the substrate is performed, thereby finally obtaining a separator having the desired physical properties, porosity, and air permeability. The heat setting step may be performed using a heating device capable of applying an appropriate temperature required for heat setting, for example, an oven. In particular, the previously dried film is finally subjected to heat setting in order to reduce the shrinkage of the final film by removing the residual stress. The purpose of heat setting is to remove residual stress by forcibly holding the film to be contracted by applying heat while the film is fixed. A high heat setting temperature is advantageous for lowering the shrinkage rate, but if the heat setting temperature is too high, the membrane is partially melted, thereby clogging the formed pores and lowering the permeability. The preferred temperature of heat setting is preferably selected in a temperature range at which approximately 10% to 30% by weight of the crystalline part of the film is melted. If the heat setting temperature is selected to be lower than the temperature at which about 10% by weight of the crystalline part of the film melts, the reorientation of polyethylene molecules in the film is insufficient, and there is no effect of removing the residual stress of the film. If the heat setting temperature is selected to be higher than the temperature at which about 30% by weight of the crystalline part of the film melts, the pores are blocked by the partial melting, thereby lowering the permeability.

2) Organic/Inorganic Composite Porous Coating Layer

In the present disclosure, the separator includes an organic/inorganic composite porous coating layer on at least one surface of the porous polymer substrate. The organic/inorganic composite porous coating layer may be a porous layer that includes a binder resin and inorganic particles, and includes a plurality of pores therein, has a structure in which the pores are connected, and gas or liquid may pass from one surface to the other.

In an embodiment of the present disclosure, the organic/inorganic composite porous coating layer includes inorganic particles and a binder resin and is on at least one surface of the porous polymer substrate. The organic/inorganic composite porous coating layer may be formed by coating and drying an aqueous slurry obtained by dispersing a water-dispersible binder resin in an aqueous solvent such as water, and as a result, the binder resin is introduced in the form of particles having a predetermined diameter within the organic/inorganic composite porous coating layer. That is, the organic/inorganic composite porous coating layer may include a mixed phase of inorganic particles and a particulate organic binder resin. As described above, since the binder resin is introduced into the organic/inorganic composite porous coating layer in the form of particles, the organic/inorganic composite porous coating layer is sufficiently porous and has excellent ion permeability, and resistance characteristics are not deteriorated.

The organic/inorganic composite porous coating layer includes a binder resin and inorganic particles. The inorganic particles and the binder resin may be included in a weight ratio of 75:25 to 90:10, and the mixture of the inorganic particles and the binder resin may be 99% by weight or more in the entire organic/inorganic composite porous coating layer.

In one embodiment of the present disclosure, the average pore size of the organic/inorganic composite porous coating layer may be in a range of 10 nm to 900 nm, preferably 20 nm to 100 nm. The porosity of the organic/inorganic composite porous coating layer is preferably 50% to 85%. When the porosity is 85% or less, it is suitable to ensure dynamic characteristics that may endure a press process that bonds to an electrode and to ensure binding force because a surface aperture ratio is not too high. In addition, when the porosity is 50% or more, the porosity is higher than that of most polymer substrates, which is advantageous in terms of ion permeability.

In an embodiment of the present disclosure, the thickness of the organic/inorganic composite porous coating layer may be in a range of 0.1 μm to 10 μm on one side of the porous polymer substrate, for example, 0.5 μm to 6 μm, or 1 μm to 5 μm. Within the above numerical range, it is preferable to set the thickness to 1 μm or more in terms of increasing adhesion force to the electrode and strength. If the thickness is 10 μm or less, it is advantageous in terms of cycle characteristics and resistance characteristics of the battery.

a. Inorganic Particles

In the present disclosure, the inorganic particles are not particularly limited as long as they are electrochemically stable in the battery driving voltage range. That is, the inorganic particles that can be used in the present disclosure are not particularly limited as long as oxidation and/or reduction reactions do not occur in the operating voltage range of the applied electrochemical device (e.g., 0 to 5 V based on Li/Li+). In particular, when inorganic particles having a high dielectric constant are used as the inorganic particles, the ionic conductivity of the electrolyte may be improved by contributing to an increase in the degree of dissociation of an electrolyte salt, such as a lithium salt, in a liquid electrolyte.

For the above reasons, the inorganic particles preferably include high dielectric inorganic particles having a dielectric constant of 5 or more, preferably 10 or more. Non-limiting examples of inorganic particles having a dielectric constant of 5 or more may include $BaTiO_3$, $Pb(Zr, Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, AlOOH, $Al(OH)_3$, SiC, $TiO_2$, etc., alone or a mixture of two or more.

In addition, as the inorganic particles, inorganic particles having a lithium ion transfer capability, that is, inorganic particles having a function of moving lithium ions without storing lithium but containing lithium elements can be used. Non-limiting examples of the inorganic particles having the lithium ion transport ability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z$)($PO_4)_3$, $0<x<2$, $0<y<1$, $0<z<3$), ($LiAlTiP)_xO_y$-containing glass ($0<x<4$, $0<y<13$), such as, $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as, $Li_{3.25}Ge_{0.25}P_{0.75}S_4$, etc., lithium nitride ($Li_xN_y$, $0<x<4$, $0<y<2$), such as, $Li_3N$, $SiS_2$-containing glass ($Li_xSi_yS_z$, $0<x<3$, $0<y<2$, $0<z<4$), such as, $Li_3PO_4$—$Li_2S$—$SiS_2$, $P_2S_5$-containing glass ($Li_xP_yS_z$, $0<x<3$, $0<y<3$, $0<z<7$), such as, LiI—$Li_2S$—$P_2S_5$, etc., or a mixture thereof.

In addition, the average particle diameter (D50) of the inorganic particles is not particularly limited but is preferably in the range of 0.1 μm to 2.5 μm in order to form a coating layer having a uniform thickness and to secure an appropriate porosity. If the average particle diameter (D50) of the inorganic particles is less than 0.1 μm, dispersibility may be reduced due to a high specific surface area, and if the average particle diameter (D50) of the inorganic particles exceeds 2.5 μm, the thickness of the formed coating layer may increase.

b. Binder Resin

In the present disclosure, the organic/inorganic composite porous coating layer may include a binder resin, and the binder resin may include 90% by weight or more of a particulate binder resin based on 100% by weight of the binder resin. The particulate binder resin has an adhesive property, and the binder resin and the inorganic particles are integrated on the surface of the porous polymer substrate in a layered structure by adhesion between particles or adhesion between the binder particles and the inorganic particles. In addition, the particulate binder resin may include a water-dispersible binder resin that is dispersed without being dissolved in water or an aqueous solvent containing water.

The particulate binder resin is an electrochemically stable material that is changed to a gel or liquid state while heat and/or pressure are applied and can be returned to a solid state after heat and pressure are removed. In an embodiment of the present disclosure, the particulate binder resin has a glass transition temperature (Tg) in the range of about −100° C. to about 50° C. and a melting temperature (Tm) in the range of about 50° C. to about 150° C. When the Tg of the particulate binder resin satisfies the above range, it is advantageous in achieving a predetermined adhesive force. When the Tg of the particulate binder resin satisfies the above range, it is advantageous to achieve a predetermined adhesive force, and when the Tg of the particulate binder resin exceeds the above range, particularly when the temperature is higher than room temperature, ion conductivity may be degraded. In an embodiment of the present disclosure, the Tg may be measured through a thermogravimetric analysis method using a TA Instrument.

According to a specific embodiment of the present disclosure, the particulate binder resin includes a polyvinylidene fluoride-containing polymer (PVdF-containing polymer) (first binder polymer) and (meth)acrylic-containing polymer (second binder polymer). The first binder polymer (PVdF-containing) and the second binder polymer (acrylic-containing) may preferably be included in a weight ratio of 40:60 to 5:95. For example, the first binder polymer (PVdF-containing) and the second binder polymer (acrylic-containing) may be included in a weight ratio of 30:70 to 5:95. When the content of the first binder polymer is excessively high, the adhesive force may be improved, but rather, the resistance of the separator may be excessively increased due to over-adhesion during the lamination process. When the content of the first binder polymer does not fall within the above range, it may be difficult to secure the desired level of adhesive force.

In the present specification, the PVdF-containing polymer may include: a homopolymer of a vinylidene fluoride monomer; a copolymer (PVdF-containing copolymer) including vinylidene fluoride and another monomer (comonomer) copolymerizable with vinylidene fluoride; or both of the homopolymer and copolymer. According to a specific embodiment of the present disclosure, the particulate polymer may include copolymer resin in consideration of the adhesive force of the electrode adhesive layer. In addition, the PVdF copolymer may be a copolymer obtained by copolymerizing vinylidene fluoride and a comonomer in a ratio of 60:40 to 96:4 based on parts by weight. For example, in the above range, the vinylidene fluoride and the comonomer may be copolymerized by being included in a ratio of 80:20 to 96:4, or 90:10 to 97:3 based on parts by weight. That is, in this disclosure, the degree of substitution of the PVdF copolymer by the comonomer can be appropriately adjusted within the range of 1% to 40% by weight. In one embodiment of the present disclosure, the degree of substitution may be in a range of 1% to 10% by weight.

In the present disclosure, the degree of substitution of the comonomer may be measured based on an integral value of characteristic peaks of the monomer identified in 1H NMR (Nuclear Magnetic Resonance) spectrum. For analysis of the degree of substitution, reference may be made to Journal of Materials Chemistry, 2012, 22, 341 or AMT-3412-0k. For the confirmation of the NMR spectrum, suitable equipment such as Bruker Avance III HD 700 Mhz NMR or Varian 500 MHz NMR may be used.

The comonomer may be a fluorinated monomer or a chlorine-containing monomer and is preferably a fluorinated monomer. Non-limiting examples of the fluorinated monomer may include at least one selected from the group consisting of vinyl fluoride; trifluoroethylene ($VF_3$); chlorofluoroethylene (CTFE); 1,2-difluoroethylene; tetrafluoroethylene (TFE); hexafluoropropylene (HFP); perfluoro(alkylvinyl)ethers such as perfluoro(methylvinyl)ether (PMVE), perfluoro(ethylvinyl)ether (PEVE), and perfluoro (propylvinyl)ether (PPVE); perfluoro(1,3-dioxole); and perfluoro(2,2-dimethyl-1,3-dioxole) (PDD). According to a specific embodiment of the present disclosure, the comonomer includes hexafluoropropylene (HFP).

In the present disclosure, the weight-average molecular weight (Mw) of the PVdF-containing polymer of the organic/inorganic composite porous coating layer is not particularly limited but is preferably 10,000 Da to 500,000 Da, more preferably 50,000 Da to 500,000 Da.

In addition, according to a specific embodiment of the present disclosure, the particulate binder resin may include a (meth)acrylic polymer. According to a specific embodiment of the present disclosure, the (meth)acrylic-containing polymer contains (meth)acrylic acid ester as a monomer, and non-limiting examples of (meth)acrylic-containing polymer may include butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth) acrylate, pentyl (meth)acrylate, n-oxyl (meth)acrylate, isooctyl (meth)acrylate, isononyl (meth)acrylate, lauryl (meth)acrylate, and tetradecyl (meth)acrylate as monomers. The (meth)acrylic-containing polymer may be included in an amount of 30% by weight or less based on 100% by weight of the particulate binder resin.

In an embodiment of the present disclosure, the particulate binder resin may have a particle diameter in a range of 100 nm to 1 μm, 100 to 500 nm, or 200 to 500 nm, or 200 to 350 nm, or 200 to 300 nm.

In the present disclosure, the method for preparing the particulate binder resin is not particularly limited, and a method for preparing a conventional particulate polymer such as a solution polymerization method, a suspension polymerization method, and an emulsion polymerization method may be applied. The emulsion polymerization method and suspension polymerization method, which can be polymerized in water and can be used as a slurry for forming an organic/inorganic composite porous coating layer as it is, are preferred among them.

c. Other Additives

The organic/inorganic composite porous coating layer may further contain additives as necessary. Examples of these additives include thickeners. The organic/inorganic composite porous coating layer can further improve the coating properties of the slurry described below and the charging and discharging characteristics of the resulting electrochemical device by containing a dispersing agent or a thickener.

Examples of a thickener, for example, may include cellulose compounds such as carboxymethyl cellulose, methyl cellulose, and hydroxypropyl cellulose; an ammonium salt or an alkali metal salt of the cellulose compound; polycarboxylic acids such as poly(meth)acrylic acid and modified poly(meth)acrylic acid; an alkali metal salt of the polycarboxylic acids; polyvinyl alcohol-containing (co) polymers such as polyvinyl alcohol, modified polyvinyl alcohol, and ethylene-vinyl alcohol copolymer; unsaturated carboxylic acids, such as (meth)acrylic acid, a maleic acid, and fumaric acid; water-soluble polymers such as a saponified product of the copolymer of vinyl ester, etc. Among these, particularly preferred thickeners are alkali metal salts of carboxymethylcellulose, alkali metal salts of poly(meth)acrylic acids, and the like.

When the organic/inorganic composite porous coating layer contains a thickener, the use ratio of the thickener is preferably 5% by weight or less based on 100% by weight of the total organic/inorganic composite porous coating layer, more preferably, 0.1 to 3% by weight.

Examples of a dispersing agent, for example, may include an acrylic based copolymer, cyanoethyl polyvinylalcohol, baicalein, luteolin, taxifolin, myricetin, quercetin, rutin, catechin, epigallocatechin gallate, butein, piceatannol, phenol-based compound containing tannic acid, pyrogallic acid, amylose, amylopectin, xanthan gum, an aliphatic based compound or polymer compounds of two or more of them.

When the organic/inorganic composite porous coating layer contains a dispersing agent, the use ratio of the dispersing agent is preferably 5% by weight or less based on 100% by weight of the total organic/inorganic composite porous coating layer, more preferably, 0.1 to 3% by weight.

d. Method for Manufacturing Organic/Inorganic Composite Porous Coating Layer

The organic/inorganic composite porous coating layer is formed by dispersing inorganic particles and a particulate binder resin in an appropriate aqueous solvent as a dispersion medium to prepare a slurry for forming the organic/inorganic composite porous coating layer, coating the slurry on at least one surface of a porous polymer substrate, and drying the slurry.

The slurry may be prepared by mixing inorganic particles and a particulate binder resin with an aqueous solvent, or a resultant such as a polymer emulsion according to suspension polymerization, liquid polymerization, emulsion phase polymerization, etc., may be used. The aqueous solvent is preferably an aqueous medium including water. The slurry uses an aqueous medium, thereby reducing negative effects on the environment, increasing stability against handling workers, and realizing a thin film of an organic/inorganic composite porous coating layer.

In one embodiment of the present disclosure, the slurry may have a solid content of 30% by weight or less. When the solid content in the slurry is greater than 30% by weight, the viscosity of the slurry may be excessively increased, and thus it is not easy to control the thickness when the slurry is coated. When the solid content in the slurry is too small, an uncoated part may be generated, and the surface of the porous polymer substrate may be exposed without being coated with the slurry, thereby causing a short circuit.

As a method of coating the slurry, a doctor blade coating method, a bar coating method, a dip coating method, a reverse roll coating method, a direct roll coating method, a gravure coating method, an extrusion coating method, a brush coating method, etc., can be used. A bar coating method, a doctor blade coating method, a gravure coating method, etc., are preferable in terms of being able to control the thickness uniformly.

The method of drying the slurry is not particularly limited, but, for example, drying by wind, such as warm air, hot air, low humidity, vacuum drying, and drying method by irradiation with (far) infrared rays or electron beams, etc., can be used.

In the present disclosure, the organic/inorganic composite porous coating layer has a structure in which polymer particles are dispersed between a separator and an electrode, and thus ion conduction between the electrode and the separator is not disturbed, thereby having low resistance increase rate and excellent life characteristics.

3) Adhesive Coating Layer

The adhesive coating layer is formed on the surface of the organic/inorganic composite porous coating layer (surface opposite the porous polymer substrate) and includes a polyvinylidene fluoride-containing (PVdF-containing) binder resin. Preferably, the adhesive coating layer may contain 90% by weight or more of a PVdF-containing binder resin based on 100% by weight of the total amount of the adhesive coating layer. For example, the adhesive coating layer may contain 90% by weight or more, or 95% by weight or more, or 99% by weight or more of PVdF-containing binder resin based on 100% by weight of the total amount of the adhesive coating layer. Alternatively, all of the binder resin may be PVdF-containing binder resin.

In the present disclosure, the binder resin may contain 90% by weight or more of the particulate binder resin based on 100% by weight of the binder resin. The particulate binder resin has an adhesive property, and the binder resin is integrated on the surface of the organic/inorganic composite porous coating layer in a layered structure by adhesion between the particles. That is, in the present disclosure, the adhesive coating layer includes a particulate PVdF-containing binder resin, for example, the binder resin in the adhesive coating layer may comprise a particulate PVdF-containing binder resin.

In an embodiment of the present disclosure, the PVdF-containing binder resin of the adhesive coating layer preferably has a weight-average molecular weight of 600,000 Da or less, 400,000 Da or less, or 300,000 Da or less. When the weight average molecular weight is 600,000 Da or less, flexibility may be increased, which is advantageous in improving adhesion force. However, when the weight average molecular weight is less than 50,000 Da, the PVdF-containing binder resin may be dissolved to increase the viscosity of the electrolyte and, thus, the ion conductivity may be degraded, and thus, the PVdF-containing binder resin may have a weight average molecular weight of 50,000 Da or more. Here, the weight-average molecular weight of the PVdF-containing binder resin may be determined by gel permeation chromatography (GPC method). The PVdF-containing binder resin having a relatively low molecular weight as described above, can be preferably obtained by emulsion polymerization or suspension polymerization, particularly can be preferably obtained by suspension polymerization.

In the present disclosure, the PVdF-containing binder resin may include a homopolymer of vinylidene fluoride (i.e., polyvinylidene fluoride), a copolymer of vinylidene fluoride and other copolymerizable monomers, or a mixture thereof. Examples of the monomer copolymerizable with vinylidene fluoride may include one type or two or more types selected from tetrafluoroethylene, hexafluoropropylene, trifluoroethylene, chlorofluoroethylene, 1,2 difluoroethylene, perfluoro(methylvinyl)ether, Perfluoro(ethylvinyl)ether, perfluoro(propylvinyl)ether, perfluoro(1,3 dioxole), perfluoro(2,2-dimethyl-1,3-dioxole), trichloroethylene, vinyl fluoride, and the like.

In an embodiment of the present disclosure, the PVdF-containing binder resin has a melting temperature (Tm) of 150° C. or less, preferably a Tm of 140° C. or less, in terms of adhesive force during heat bonding. To this end, the binder resin includes a copolymer of vinylidene fluoride and a monomer copolymerizable with vinylidene fluoride as a polymer unit, and the copolymer may contain 70% by weight or more of vinylidene fluoride. In addition, the copolymer may have a degree of substitution by other copolymerizable monomers as described above in a range of 10% to 40% by weight, for example, may have in a range of 1% to 10% by weight.

Meanwhile, in one embodiment of the present disclosure, the adhesive coating layer may be formed to a thickness of 8% to 30% based on 100% of the thickness of the organic/inorganic composite porous coating layer (first coating layer).

The adhesive coating layer may be formed, for example, by the following method but is not particularly limited thereto.

In the present disclosure, the adhesive coating layer is formed by dispersing a particulate binder resin in an appropriate aqueous solvent as a dispersion medium to prepare a composition for forming an adhesive coating layer, coating the composition on the surface of the organic/inorganic composite porous coating layer, and drying the composition.

The composition may be prepared by mixing a particulate binder resin with an aqueous solvent, or a resultant product such as a polymer emulsion according to suspension polymerization, liquid polymerization, emulsion polymerization, or the like may be used. The aqueous solvent is preferably an aqueous medium including water. By using the aqueous medium, the slurry has a low degree of adverse effect on the environment, increases stability for handling workers, and can realize thinning of the adhesive coating layer.

As a method of coating the composition, a bar coating method, a doctor blade coating method, a dip coating method, a reverse roll coating method, a direct roll coating method, a gravure coating method, an extrusion coating method, a brush coating method, etc., can be used. A doctor blade coating method, a gravure coating method, etc., are preferable in terms of being able to control the thickness uniformly.

The method of drying the composition is not particularly limited, but, for example, drying by wind, such as warm air, hot air, low humidity, vacuum drying, and drying method by irradiation with (far) infrared rays or electron beams, etc., can be used.

In the present disclosure, the adhesive coating layer has a structure in which polymer particles are dispersed between a separator and an electrode, and thus ion conduction between the electrode and the separator is not disturbed, thereby having a low resistance increase rate and excellent life characteristics.

The separator, according to the present disclosure having the above-described structural characteristics, may have a resistance of 0.6 ohms or less. In addition, the air permeability may have a value of 100 sec/100 cc or less. When the resistance and/or air permeability of the separator is excessively high, lifespan characteristics may deteriorate during repeated battery charging and discharging processes, which is not preferable. In the separator, according to the present disclosure, since the composite coating layer and the adhesive coating layer are manufactured in a water-based method, even when the composite coating layer and the adhesive coating layer are disposed on the surface of the polymer substrate, resistance may be 0.6 ohms or less, and thus air permeability may be independently maintained to be low to 100 sec/100 cc or less.

In the present disclosure, the resistance is a value when the separator is impregnated with an electrolyte. In an embodiment of the present disclosure, the resistance may be a value measured by an alternating current method (frequency 10,000 to 100,000 Hz) at 25° C. after impregnating the polymer substrate in an electrolyte solution. The electrolyte may be mixed with ethylene carbonate and ethylmethyl carbonate as a solvent in a 3:7 volume ratio, vinylene carbonate may be further included in a ratio of 2% by weight based on the total solvent, and $LiPF_6$ may be included at a concentration of 1 M.

2. Electrode Assembly Including the Separator

Meanwhile, the present disclosure provides a secondary battery including the separator. The battery includes an anode, a cathode, and a separator interposed between the anode and the cathode, and the separator is a low-resistance separator having the above-described characteristics.

In the present disclosure, the cathode includes a cathode current collector and a cathode active material layer including a cathode active material, a conductive material, and a binder resin on at least one surface of the current collector. The cathode active material may include one or two or more of a mixture among layered compounds such as lithium manganese oxide ($LiMn_2O_4$, $LiMnO_2$, etc.), lithium cobalt oxide ($LiCoO_2$), lithium nickel oxide ($LiNiO_2$), or a compound substituted with one or more transition metals; lithium manganese oxides of the formula $Li_{1+x}Mn_{2-x}O_4$ (where x is 0 to 0.33), $LiMnO_3$, $LiMn_2O_3$, $LiMnO_2$, and the like; lithium copper oxide ($Li_2CuO_2$); vanadium oxides such as $LiV_3O_8$, $LiFe_3O_4$, $V_2O_5$, and $Cu_2V_2O_7$; Ni site-type lithium nickel oxide represented by the formula $LiNi_{1-x}M_xO_2$ (where M=Co, Mn, Al, Cu, Fe, Mg, B, or Ga, and x=0.01 to 0.3); lithium manganese composite oxides represented by the formula $LiMn_{2-x}M_xO_2$ (where M=Co, Ni, Fe, Cr, Zn, or Ta and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$.

In the present disclosure, the anode includes an anode current collector and an anode active material layer including an anode active material, a conductive material, and a binder resin on at least one surface of the current collector. The anode may include at least one component or two or more of a mixture as an anode active material selected from the group consisting of carbons such as lithium metal oxide, non-graphitized carbon, and graphite-containing carbon; metal composite oxides such as $Li_xFe_2O_3 (0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, elements of groups 1, 2, and 3 of the periodic table, halogen; $0 < x \leq 1$; $1 \leq y \leq 3$; $1 \leq z \leq 8$); lithium metal; lithium alloy; silicon-containing alloys; tin-containing alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-containing materials; and titanium oxides.

In the present disclosure, the conductive material may be, for example, any one selected from the group consisting of graphite, carbon black, carbon fiber, or metal fiber, metal powder, conductive whisker, conductive metal oxide, activated carbon, and polyphenylene derivatives, or a mixture of two or more conductive materials. More specifically, the conductive material may be one selected from the group consisting of natural graphite, artificial graphite, super-p, acetylene black, Ketjen black, channel black, furnace black, lamp black, summer black, Denka black, aluminum powder, nickel powder, zinc oxide, potassium titanate, and titanium oxide, or a mixture of two or more of these conductive materials.

The current collector is not particularly limited as long as it has high conductivity without causing a chemical change in the battery, and for example, stainless steel, copper, aluminum, nickel, titanium, calcined carbon, or surface treatment material of aluminum or stainless steel with carbon, nickel, titanium, silver, etc., may be used.

A polymer commonly used for electrodes in the art as the binder resin may be used. Non-limiting examples of such binder resins include polyvinylidene fluoride-co-hexafluoropropylene, polyvinylidene fluoride-co-trichloroethylene, polyethylhexyl acrylate, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose and the like, but is not limited thereto.

The electrode assembly prepared as described above may be loaded in an appropriate case, and electrolyte may be injected to manufacture a battery.

In the present disclosure, the electrolyte solution is a salt having the same structure as $A^+B^-$, and $A^+$ includes ions formed of alkali metal cations such as $Li^+$, $Na^+$, $K^+$, or a combination thereof, or $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), and gamma butyrolactone (g-butyrolactone), but is not limited thereto.

In addition, the present disclosure provides a battery module including a battery including the electrode assembly as a unit cell, a battery pack including the battery module, and a device including the battery pack as a power source. Specific examples of the device include a power tool powered by a battery motor; electric vehicles, including electric vehicles (EVs), hybrid electric vehicles (HEVs), plug-in hybrid electric vehicles (PHEVs), and the like; electric two-wheeled vehicles, including electric bicycles (E-bikes) and electric scooters (E-scooter); electric golf carts; and a power storage system, but is not limited thereto.

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

EXAMPLES

In Examples 1 and 2, polypropylene material polymer substrates having thickness and porosity, as shown in [Table 1] below, were prepared.

TABLE 1

Physical properties of the polymer substrate (before forming the coating layer)

| | Thickness (μm) | Porosity (%) | Full width at half maximum (nm) | Resistance (ohm) | Average pore size (nm) |
|---|---|---|---|---|---|
| Example 1 | 9.1 | 40.4 | ◉ | ⊙ | 27 |
| Example 2 | 9.2 | 41.2 | ◉ | ⊙ | 26 |

◉: less than 8 nm,
◐: greater than 8 nm
⊙: less than 0.6 ohm,
◓: greater than 0.6 ohm Example 1

PVdF-HFP (Arkema, particle size 0.2 μm, HFP substitution degree of about 5% by weight) was added to an acrylic-containing water dispersion emulsion (Toyoink, CSB130, solid content 40%, particle size 177 nm) and dispersed. The content ratio of acrylic-containing water emulsion to the PVdF was mixed to be 80:10 by weight. Next, $Al_2O_3$ (Nippon Light Metals Co., Ltd., LS235, particle size 510 nm) was added and dispersed. In addition, carboxymethyl cellulose (GLchem, SG-L02) was added and dispersed as a thickener to prepare a slurry for forming an organic/inorganic composite porous coating layer. The solid content in the slurry was 30% by weight, and the content ratio of the binder resin (acrylic binder particles and PVdF particles) and the inorganic particles was 15:85. The slurry was mixed for 2 hours using a basket milling device. The slurry was coated on one surface of the polymer substrate using a doctor blade and dried to form an organic/inorganic composite porous coating layer.

PVdF-HFP (Arkema, particle size 0.2 μm, HFP substitution degree of about 5% by weight) was added to deionized water and dispersed to prepare a composition for forming an adhesive coating layer. The content of solids in the composition was 20% by weight. The composition was coated to one surface of the organic/inorganic composite porous coating layer using a doctor blade and dried to form an adhesive coating layer.

In the separator obtained in Example 1, the total thickness (one side) of the organic/inorganic composite porous coating layer and the adhesive coating layer was 4.1 μm, and the thickness ratio of the organic/inorganic composite porous coating layer and the adhesive coating layer was about 7:1.

FIG. 1 is a schematic showing the layers present in Example 1.

Example 2

A separator was prepared in the same manner as in Example 1, except that the total thickness (one side) of the organic/inorganic composite porous coating layer and the adhesive coating layer was 4.2 μm. In the separator of Example 2, the thickness ratio of the organic/inorganic composite porous coating layer and the adhesive coating layer was about 7:1.

COMPARATIVE EXAMPLES

Comparative Example 1

Polypropylene material polymer substrates having thickness and porosity, as shown in [Table 2] below, were prepared.

TABLE 2

Physical properties of the polymer substrate (before forming the coating layer)

| | Thickness (μm) | Porosity (%) | Full width at half maximum (nm) | Resistance (ohm) | Average pore size (nm) |
|---|---|---|---|---|---|
| Comparative Example 1 | 9.3 | 42.6 | ⊚ | ⊙ | 27 |
| Comparative Example 2 | 9.2 | 48.5 | ◐ | ◑ | 46 |
| Comparative Example 3 | 9.1 | 49.2 | ◐ | ◑ | 47 |
| Comparative Example 4 | 9.3 | 42.6 | ⊚ | ⊙ | 27 |

⊚: less than 8 nm,
◐: greater than 8 nm,
⊙: less than 0.6 ohm,
◑: greater than 0.6 ohm PVdF-HFP (Arkema, particle size 0.2 μm, HFP substitution degree of about 5% by weight) was added to an acrylic-containing water dispersion emulsion (Toyoink, CSB130, solid content 40%, particle size 177 nm) and dispersed. The content ratio of acrylic-containing water emulsion and PVdF was mixed to be 80:20 by weight. Next, $Al_2O_3$ (Nippon Light Metals Co., Ltd., LS235, particle size 510 nm) was added and dispersed. In addition, carboxymethyl cellulose (GLchem, SG-L02) was added and dispersed as a thickener to prepare a slurry for forming an organic/inorganic composite porous coating layer. The solid content in the slurry was 30% by weight, and the content ratio of the binder resin (acrylic binder particles and PVdF particles) and the inorganic particles was 15:85. The slurry was mixed for 2 hours using a basket milling device. The slurry was coated on one surface of the porous polymer substrate using a doctor blade and dried to form an organic/inorganic composite porous coating layer. In the separator obtained in Comparative Example 1, the thickness (one side) of the organic/inorganic composite porous coating layer was 4.1 μm.

FIG. 2 is a schematic showing the layers present in Comparative Example 1.

Comparative Example 2

Polypropylene material polymer substrates having thickness and porosity, as shown in [Table 2] above, were prepared. PVdF-HFP (Arkema, particle size 0.2 μm, HFP substitution degree of about 5% by weight) was added to an acrylic-containing water dispersion emulsion (Toyoink, CSB130, solid content 40%, particle size 177 nm) and dispersed. The content ratio of acrylic-containing water emulsion and PVdF was mixed to be 80:10 by weight. Next, $Al_2O_3$ (Nippon Light Metals Co., Ltd., LS235, particle size 510 nm) was added and dispersed. In addition, carboxymethyl cellulose (GLchem, SG-L02) was added and dispersed as a thickener to prepare a slurry for forming an organic/inorganic composite porous coating layer. The solid content in the slurry was 30% by weight, and the content ratio of the binder resin (acrylic binder particles and PVdF particles) and the inorganic particles was 15:85. The slurry was mixed for 2 hours using a basket milling device. The slurry was coated on one surface of the polymer substrate using a doctor blade and dried to form an organic/inorganic composite porous coating layer.

PVdF-HFP (Arkema, particle size 0.2 μm, HFP substitution degree of about 5% by weight) was added to deionized water and dispersed to prepare a composition for forming an adhesive coating layer. The content of solids in the composition was 20% by weight. The composition was coated to one surface of the organic/inorganic composite porous coating layer using a doctor blade and dried to form an adhesive coating layer.

In the separator obtained in Comparative Example 2, the total thickness of the organic/inorganic composite porous coating layer and the adhesive coating layer was 4.2 μm. In addition, the thickness ratio of the organic/inorganic composite porous coating layer and the adhesive coating layer was about 7:1.

FIG. 3 is a schematic showing the layers present in Comparative Example 2.

Comparative Example 3

Polypropylene material polymer substrates having thickness and porosity, as shown in [Table 2] above, were prepared.

PVdF-HFP (Arkema, particle size 0.2 μm, HFP substitution degree of about 5% by weight) was added to an acrylic-containing water dispersion emulsion (Toyoink, CSB130, solid content 40%, particle size 177 nm) and dispersed. The content ratio of acrylic-containing water emulsion and PVdF was mixed to be 80:20 by weight. Next, $Al_2O_3$ (Nippon Light Metals Co., Ltd., LS235, particle size 510 nm) was added and dispersed. In addition, carboxymethyl cellulose (GLchem, SG-L02) was added and dispersed as a thickener to prepare a slurry for forming an organic/inorganic composite porous coating layer. The solid content in the slurry was 30% by weight, and the content ratio of the binder resin (acrylic binder particles and PVdF particles) and the inorganic particles was 15:85. The slurry was mixed for 2 hours using a basket milling device. The slurry was coated on one surface of the polymer substrate using a doctor blade and dried to form an organic/inorganic composite porous coating layer. In the separator obtained in Comparative Example 3, the thickness (one side) of the organic/inorganic composite porous coating layer was 4.1 μm.

FIG. 4 is a schematic showing the layers present in Comparative Example 3.

Comparative Example 4

PVdF-HFP (Arkema, particle size 0.2 μm, HFP substitution degree of about 5% by weight) as a binder resin was solved in acetone and $Al_2O_3$ (Nippon Light Metals Co., Ltd., LS235, particle size 510 nm) was added and dispersed. In addition, carboxymethyl cellulose (GLchem, SG-L02) was added and dispersed as a thickener to prepare a slurry for forming an organic/inorganic composite porous coating layer. The solid content in the slurry was 30% by weight, and the content ratio of the binder resin (acrylic binder particles and PVdF particles) and the inorganic particles was 15:85. The slurry was mixed for 2 hours using a basket milling device. The slurry was coated on one surface of the polymer substrate using a doctor blade and dried to form an organic/inorganic composite porous coating layer.

PVdF-HFP (Arkema, particle size 0.2 μm, HFP substitution degree of about 5% by weight) was added to deionized water and dispersed to prepare a composition for forming an adhesive coating layer. The content of solids in the composition was 20% by weight. The composition was coated to one surface of the organic/inorganic composite porous coating layer using a doctor blade and dried to form an adhesive coating layer.

In the separator obtained in comparative example 4, the total thickness (one side) of the organic/inorganic composite porous coating layer and the adhesive coating layer was 4.1 µm, and the thickness ratio of the organic/inorganic composite porous coating layer and the adhesive coating layer was about 7:1.

FIG. 5 is a schematic showing the layers present in comparative example 4.

[Measurement of Physical Properties]

The thickness, air permeability, resistance (ER), etc., of the separator obtained in Examples and Comparative Examples before and after compression, was measured. In addition, each physical property was measured after applying pressure to the separator of each Example and Comparative Example at a pressure of 5.2 MPa at 70° C. for 10 seconds. [Table 3] shows the physical properties before compressing the separator, and [Table 4] shows the physical properties after compressing the separator The separator was immersed in acetone and sonication was performed for 15 minutes to remove each coating layer and extract the porous substrate.

(1) Thickness Measurement

The thickness of the polymer substrate and the separator was measured using a contact thickness meter (Mitutoyo, VL50S-B)

(2) Air Permeability Measurement

The time for 100 ml of air to pass through the separator was measured using a reciprocating air permeability measuring device (Asahi Seiko).

(3) ER (Resistance Measurement)

Electrolyte was prepared by mixing ethylene carbonate and ethylmethyl carbonate with a composition of 3:7, vinylene carbonate was added in an amount of 2% by weight to the solvent, and $LiPF_6$ was added to a concentration of 1 M. The separators of the Examples and Comparative Examples were impregnated with an electrolyte and measured at 25° C. by an alternating current method (frequency 10,000 to 100,000 Hz).

(4) Pore Size Distribution Measurement

Samples were obtained with a size of 5 cm in the TD direction and 5 cm in the MD direction at the center part of the polymer substrate in each of the Examples and Comparative Examples in the width direction. For each sample obtained, a drying curve was obtained using a Perm-Porometer (CFP-1500A) manufactured by Porous Materials Inc. (PMI). In addition, a wet curve was obtained after filling the porous substrate with a Galwick solution. The measurement pressure was in the range of 0 to 3500 MPa. From this, the distribution of the pores of the polymer substrate and the values of the full width at half maximum was calculated. In the obtained curve, the bubble point may represent the maximum diameter of the pores and the point where the wet sample curve and the dry sample curve meet may represent the minimum diameter of the pores. In addition, the point at which the air permeability curve for ½ dry sample, which is a value corresponding to ½ the value of the air permeability curve for a dry sample, and the wet sample curve are met, may represent the average pore diameter (see FIG. 6).

TABLE 3

The measurement result of the physical properties of the membrane before compression Separator properties before compression

| | Polymer substrate Thickness (µm) | Thickness of organic/inorganic composite porous coating layer and adhesive coating layer (µm) (If there is no adhesive coating layer, only the thickness of the organic/inorganic porous coating layer) | Permeability of separator (sec/100 cc) | The resistance of the separator (ohm) | Polymer substrate Porosity (vol %) |
|---|---|---|---|---|---|
| Comparative Example 1 | 9.3 | 4.1 | 92 | 0.571 | 42.6 |
| Comparative Example 2 | 9.2 | 4.2 | 92 | 0.501 | 48.5 |
| Comparative Example 3 | 9.1 | 4.1 | 93 | 0.522 | 49.2 |
| Comparative Example 4 | 9.3 | 4.1 | 148 | 0.564 | 47.4 |
| Example 1 | 9.1 | 4.1 | 91 | 0.589 | 40.4 |
| Example 2 | 9.2 | 4.2 | 94 | 0.524 | 41.2 |

TABLE 4

The measurement result of the physical properties of the membrane after compression Separator properties after compression

| | Polymer substrate Thickness (µm) | Thickness of organic/inorganic composite porous coating layer and adhesive coating layer (µm) (If there is no adhesive coating layer, only the thickness of the organic/inorganic porous coating layer) | Permeability of separator (sec/100 cc) | The resistance of the separator (ohm) | Polymer substrate Porosity (vol %) |
|---|---|---|---|---|---|
| Comparative Example 1 | 8.3 | 3.4 | 287 | 0.889 | 32.2 |

TABLE 4-continued

The measurement result of the physical properties of the membrane after compression Separator properties after compression

| | Polymer substrate Thickness (μm) | Thickness of organic/inorganic composite porous coating layer and adhesive coating layer (μm) (If there is no adhesive coating layer, only the thickness of the organic/inorganic porous coating layer) | Permeability of separator (sec/100 cc) | The resistance of the separator (ohm) | Polymer substrate Porosity (vol %) |
|---|---|---|---|---|---|
| Comparative Example 2 | 8.0 | 3.4 | 302 | 0.901 | 27.2 |
| Comparative Example 3 | 7.9 | 3.5 | 322 | 0.921 | 22.9 |
| Comparative Example 4 | 8 | 3.2 | 370 | 1.073 | 20.1 |
| Example 1 | 8.2 | 3.5 | 142 | 0.778 | 36.4 |
| Example 2 | 8.4 | 3.4 | 138 | 0.625 | 37.7 |

TABLE 5

Comparison of the measurement results of the physical properties of the separation membrane before and after compression Membrane properties before and after compression (after compression-before compression)

| | Polymer substrate Thickness (μm) | Thickness of organic/inorganic composite porous coating layer and adhesive coating layer (μm) (If there is no adhesive coating layer, only the thickness of the organic/inorganic porous coating layer) | Permeability of separator (sec/100 cc) | The resistance of the separator (ohm) | Polymer substrate Porosity (vol %) |
|---|---|---|---|---|---|
| Comparative Example 1 | −1.0 | −0.7 | 195 | 0.318 | −10.4 |
| Comparative Example 2 | −1.2 | −0.8 | 210 | 0.400 | −21.3 |
| Comparative Example 3 | −1.2 | −0.6 | 229 | 0.399 | −26.3 |
| Comparative Example 4 | −1.3 | −0.9 | 222 | 0.509 | −27.3 |
| Example 1 | −0.9 | −0.6 | 51 | 0.183 | −4.0 |
| Example 2 | −0.8 | −0.8 | 44 | 0.101 | −3.5 |

As shown in [Table 5], the thickness reduction rate of the polymer substrate in the separator of the Examples was lower than that of the Comparative Examples. The thickness reduction rate of the porous coating layer showed a similar range in the Examples and the Comparative Examples. On the other hand, the air permeability of the separator showed a difference of about 200 sec/100 cc before and after compression in the case of the Comparative Examples, but in the case of the Examples, it was confirmed that only about 50 sec/100 cc was increased, indicating that the compression resistance was excellent. It was confirmed that this change also affects the resistance of the separator. In the case of the Comparative Examples, the resistance of the separator increased by 0.3 ohms or more, but in the case of the Examples, the resistance of the separator was only an increase of 0.2 ohms. According to the result of confirming the change in porosity of the polymer substrate, in the case of the Examples, it was confirmed that the porosity decreased by about 4 vol % or less, but in the case of the Comparative Examples, the decrease was confirmed by more than 10 vol %. As confirmed above, in the case of the separator, according to the present disclosure, it was confirmed that the compression resistance was improved.

What is claimed is:

1. A separator comprising:
   a porous polymer substrate;
   an organic/inorganic composite porous coating layer on at least one surface of the porous polymer substrate; and
   an adhesive coating layer on a surface of the organic/inorganic composite porous coating layer opposite the porous polymer substrate, wherein the porous polymer substrate has an average pore size of 40 nm or less,
wherein the porous polymer substrate comprises a polymer membrane having a full width at half maximum (FWHM) value of 8.0 nm or less of a Gaussian pore distribution measured through pore size distribution as a dispersion of pores,
wherein the organic/inorganic composite porous coating layer comprises a particulate binder resin and inorganic particles,
wherein the particulate binder resin comprises an acrylic binder resin and a polyvinylidene fluoride PVdF-containing binder resin, and
wherein the adhesive coating layer comprises a PVdF-containing binder resin.

2. The separator of claim 1, wherein the porous polymer substrate has an air permeability of 100 sec/100 cc or less and a resistance of 0.6 ohms or less.

3. The separator of claim 1, wherein the separator has an air permeability of 100 sec/100 cc or less and a resistance of 0.6 ohms or less.

4. The separator of claim 1, wherein the porous polymer substrate has a porosity of 20 vol % to 50 vol %.

5. The separator of claim 1, wherein the organic/inorganic composite porous coating layer comprises the inorganic particles and the particulate binder resin in a weight ratio of 75:25 to 90:10.

6. The separator of claim 1, wherein in the organic/inorganic composite porous coating layer, an amount of a mixture of the inorganic particles and the particulate binder resin is 99% by weight or more based on 100% by weight of a total weight of the organic/inorganic composite porous coating layer.

7. The separator of claim 1, wherein in the organic/inorganic composite porous coating layer, the PVdF-containing binder resin and the acrylic binder resin are comprised in a weight ratio of 30:70 to 5:95.

8. The separator of claim 1, wherein the adhesive coating layer comprises 90% by weight or more of the PVdF-containing binder resin based on 100% by weight of a total weight of the adhesive coating layer.

9. The separator of claim 8, wherein the PVdF-containing binder resin of the adhesive coating layer has a weight-average molecular weight of 600,000 Da or less.

10. The separator of claim 1, wherein the PVdF-containing binder resin of the organic/inorganic composite porous coating layer and the PVdF-containing binder resin of the adhesive coating layer each comprise a copolymer of vinylidene fluoride and a monomer copolymerizable with vinylidene fluoride as a polymer unit, and the copolymer comprises 70% by weight or more of vinylidene fluoride.

11. The separator of claim 10, wherein the PVdF-containing binder resins have a degree of substitution by the monomer of 1% to 40% by weight.

12. The separator of claim 1, wherein the particulate binder resin comprises a water-dispersible binder resin.

13. The separator of claim 1, wherein the adhesive coating layer has a thickness in a range of 8% to 30% based on 100% of a thickness of the organic/inorganic composite porous coating layer.

14. An electrochemical device, comprising:
an anode;
a cathode; and
the separator of claim 1 between the anode and the cathode.

15. The separator of claim 1, wherein the organic/inorganic composite porous coating layer has a porosity of 50 vol % to 85 vol %.

16. The separator of claim 1, wherein the organic/inorganic composite porous coating layer has a thickness of 0.1 µm to 10 µm.

17. The separator of claim 1, wherein the particulate binder resin has a glass transition temperature of −100° C. to 50° C. and a melting temperature of 50° C. to 150° C.

18. The separator of claim 1, wherein the average pore size of the porous polymer substrate is 27 nm or less.

19. A method for manufacturing the separator of claim 1, the method comprising:
preparing the porous polymer substrate;
forming the organic/inorganic composite porous coating layer on the at least one surface of the porous polymer substrate; and
forming the adhesive coating layer on the surface of the organic/inorganic composite porous coating layer opposite the porous polymer substrate,
wherein the forming of the organic/inorganic composite porous coating layer is performed by dispersing the inorganic particles and the particulate binder resin in an aqueous solvent as a dispersion medium to prepare a slurry for forming the organic/inorganic composite porous coating layer, coating the slurry on the surface of the porous polymer substrate, and drying the slurry, and
the forming of the adhesive coating layer is performed by dispersing a particulate PVdF-containing binder resin in an aqueous solvent that is a dispersion medium to prepare a composition for forming the adhesive coating layer, coating the composition on the surface of the organic/inorganic composite porous coating layer, and drying the composition.

* * * * *